(12) United States Patent
Armand

(10) Patent No.: US 10,499,432 B1
(45) Date of Patent: Dec. 3, 2019

(54) INTERACTIVE SPECTRUM MANAGEMENT TOOL

(71) Applicant: T-Mobile USA, Inc., Bellevue, WA (US)

(72) Inventor: Ahmad Armand, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/974,540

(22) Filed: May 8, 2018

(51) Int. Cl.
*H04W 16/14* (2009.01)
*H04W 74/08* (2009.01)
*H04W 28/16* (2009.01)
*G06F 16/248* (2019.01)

(52) U.S. Cl.
CPC ...... *H04W 74/0816* (2013.01); *G06F 16/248* (2019.01); *H04W 16/14* (2013.01); *H04W 28/16* (2013.01)

(58) Field of Classification Search
CPC . G06F 16/248; H04W 16/14; H04W 74/0816; H04W 28/16
USPC ........................................................ 370/329
See application file for complete search history.

(56) References Cited

U.S. PATENT DOCUMENTS

| | | | | |
|---|---|---|---|---|
| 9,831,899 | B1 * | 11/2017 | Boghrat | H04B 1/0475 |
| 10,040,440 | B2 * | 8/2018 | Iwagami | B60W 10/06 |
| 10,237,877 | B1 * | 3/2019 | Singh | H04W 72/0486 |
| 2004/0235428 | A1 * | 11/2004 | Nagai | G06K 7/0008 455/85 |
| 2008/0037665 | A1 * | 2/2008 | Maeki | H04W 16/16 375/260 |
| 2011/0032892 | A1 * | 2/2011 | Bahl | H04L 5/0032 370/329 |
| 2012/0069804 | A1 * | 3/2012 | Kim | H04W 72/0453 370/329 |
| 2013/0051359 | A1 * | 2/2013 | Skarby | H04W 72/1226 370/330 |
| 2015/0043523 | A1 * | 2/2015 | Luo | H04W 16/14 370/330 |
| 2015/0117392 | A1 | 4/2015 | Hammarwall et al. | |
| 2016/0219495 | A1 * | 7/2016 | Martin | H04W 48/16 |
| 2016/0219593 | A1 * | 7/2016 | Ashraf | H04W 72/0453 |

(Continued)

FOREIGN PATENT DOCUMENTS

CN 103065503 * 2/2015 ............... G08G 3/00

OTHER PUBLICATIONS

U.S. Appl. No. 16/195,643, Non-Final Office Action dated May 15, 2019, 16 pages.

*Primary Examiner* — Phong La
(74) *Attorney, Agent, or Firm* — Han Santos, PLLC

(57) ABSTRACT

An interactive spectrum management tool that provides comprehensive information on wireless spectrum bands of a radio spectrum is provided. The tool assists in determining whether a frequency band in the spectrum is available for wireless transmission at any particular place and time by gathering, analyzing, and presenting comprehensive information about the frequency band. The comprehensive information includes different types of information regarding the allocation, regulation, ownership, and use of the frequency band. The tool extracts and analyzes the different types of allocation and usage information from different databases that are maintained by various different public and private agencies at international, national, and local levels.

18 Claims, 8 Drawing Sheets

(56) References Cited

U.S. PATENT DOCUMENTS

| | | |
|---|---|---|
| 2017/0006154 A1* | 1/2017 | Shridhar .................. H04M 3/34 |
| 2017/0099675 A1* | 4/2017 | Gineste ............. H04W 72/1263 |
| 2017/0208540 A1* | 7/2017 | Egner ................... H04W 4/029 |
| 2017/0280472 A1* | 9/2017 | Gupta ................... H04L 5/0007 |
| 2019/0110317 A1 | 4/2019 | Zhang et al. |

* cited by examiner

INTERACTIVE SPECTRUM MANAGEMENT TOOL

BACKGROUND

The availability of radio spectrums is vital to wireless network carriers that use wireless technologies, such as 3G, 4G, and even 5G, to provide telecommunication services. The use of the radio spectrums within a nation state is generally regulated by a corresponding government of the nation state. The government of the nation state may license various bands of the radio spectrum to one or more licensees such that each licensee has exclusive use of a particular band of the radio spectrum. In order to better utilize the available radio frequency spectrums in the United States, the U.S. federal government has advocated the sharing of unused federal radio spectrums at various locations and during different times.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to an interactive spectrum management tool that provides comprehensive information on wireless spectrum bands, including current, future, licensed, unlicensed, and shared bands. The tool assists in determining whether a frequency band in the spectrum is available for wireless transmission at any particular place and time by gathering and presenting comprehensive information about the frequency band. The comprehensive information includes different types of information regarding the allocation, regulation, ownership, and use of the frequency band. The tool extracts the different types of allocation and usage information from different databases that are maintained by various different public and private agencies at international, national, and local levels. Examples of these agencies include the Federal Communications Commission (FCC), the National Telecommunications and Information Administration (NTIA), the International Telecommunications Union (ITU), and the Third Generation Partnership Project (3GPP).

The spectrum management tool provides responses to specific queries based on the data received from the various databases. The response may include text, graphical illustration, maps, or any combination through drop down menus. The tool may also be capable of spectrum analysis to determine in band and out of band interference for potential spectrum sharing. The tool allows its user to interactively identify a suitable frequency band for transmission for a given place and time. The tool may also be implemented at a base station to identify spectrum-sharing opportunities for transmission.

Figure 1:
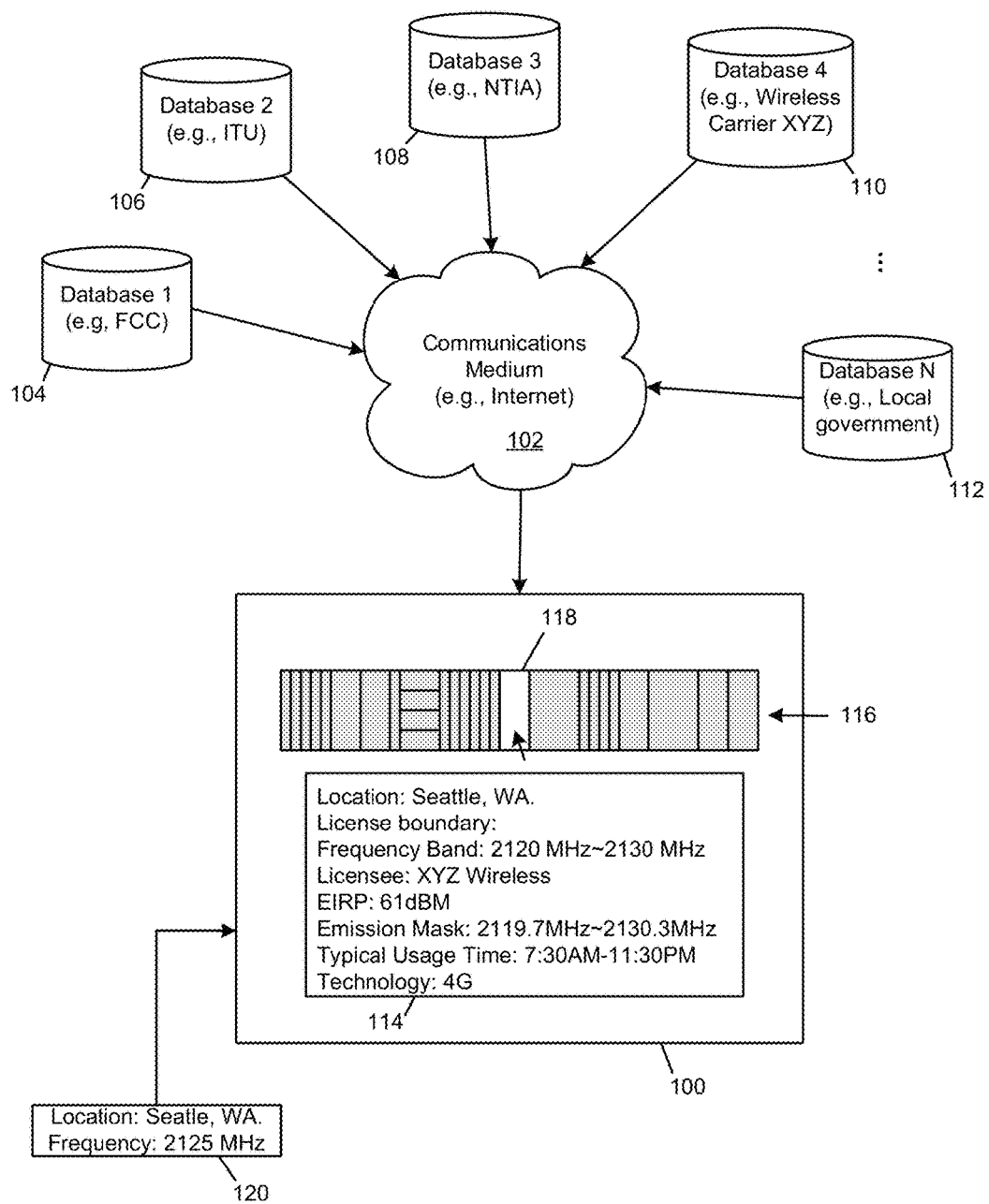
FIG. 1 conceptually illustrates a spectrum management tool that provides comprehensive information on wireless spectrum bands, consistent with an exemplary embodiment.

FIG. 1 conceptually illustrates a spectrum management tool 100 that provides comprehensive information on wireless spectrum bands. The spectrum management tool 100 responds to queries regarding any frequency band in the spectrum by presenting allocation and usage data relevant to the query from the different databases in one presentation.

The response to a query regarding a frequency band may include usage and allocation data such as the spectrum range of the band, any sub-bands of the band, FCC channel sizes, adjacent bands or adjacent channels, usage type, identity of users, 3GPP band designation, technology type, FCC power limit, FCC out-of-band emission limits, antenna height limits, 3GPP emission masks, spectrum usage in location, frequency, and time.

The spectrum management tool 100 receives different types of usage and allocation information for the frequency band from different databases. As illustrated, the spectrum management tool 100 uses the communications medium 102 to access data stored in a variety of different databases 104, 106, 108, 110, and 112. For example, the tool may retrieve information regarding channel sizes, adjacent bands, power and out of band emission limits from federal government databases; information regarding technology type from a wireless carrier database; information regarding antenna height limit from a local government database; information regarding 3GPP band designation and 3GPP emissions masks from a technical consortium (e.g., ITU) database; etc. Some of the retrieved information may include static information that is predefined. Some of the retrieved information may include dynamic information that is determined in real-time.

Though the use of the radio spectrum is federally regulated and allocated, a band of frequency may be licensed or allocated to different entities at different geographic locations or jurisdictions, and these different entities in different locations are likely to have different usage data. In some embodiments, the spectrum management tool 100 receives a selection of a geographical location and identifies usage data relevant to the selected geographical location for presentation.

In the example, the spectrum management tool 100 receives a query regarding the frequency 2125 MHz for a location in Seattle, Wash. The tool 100 in turn presents allocation and usage information regarding a frequency band 2120 MHz~2130 MHz in the Seattle area. The information includes the license boundary of the frequency band, the identity of the licensee ("XYZ wireless"), the EIRP (Equivalent Isotropically Radiated Power) of the signal ("61 dBm"), the emission mask of the signal (2119.7 MHz~2130.3 MHz), typical actual usage time of the band ("7:30 AM to 11:30 PM"), and the wireless technology type used by the licensee ("4G"). The tool 100 obtains different parts of the allocation and usage information from the different databases 104-112. The spectrum management tool 100 presents the various pieces of the allocation and usage information as one presentation, e.g., in one data structure, in one visual element, in the same textual listing, in the same display, in the same table, in the same window, in the same report, in the same reporting dashboard, etc.

In some embodiments, the spectrum management tool 100 provides a graphical user interface (GUI). At least some of the information gathered from the different databases may be presented together in one information window 114 as a GUI item.

In some embodiments, the GUI of the spectrum management tool 100 includes a GUI control for accepting a selection of a frequency band and at least one GUI control for displaying allocation and usage information relevant to the selected frequency band. In some embodiments, the GUI control for accepting the selection of a frequency band includes a frequency allocations chart that shows various divisions of the radio spectrum. A division may correspond to a frequency band or a sub-division of a frequency band. In some embodiments, the spectrum management tool generates the frequency allocation chart based on a frequency allocation chart provided by the government, such as the frequency allocation chart of the United States.

A user of the spectrum management tool 100 may use the GUI to select a division in the radio spectrum. In turn, the spectrum management tool 100 may display the allocation and usage information for the selected division. In the example of FIG. 1, the GUI of the spectrum management tool 100 includes a frequency allocation chart 116 to represent the radio spectrum. As illustrated, a division 118 of the allocation chart 116 is selected. (The selection is conceptually illustrated by an input 120 to the GUI; this input may correspond to a cursor position, a textual input, a user gesture, etc.) In the example, the division 118 corresponds to a frequency band that occupies a range of 2120 MHz~2130 MHz in the radio spectrum. The selection of the division 118 causes the spectrum management tool 100 to output the allocation and usage information relevant to the 2120 MHz~2130 MHz frequency band.

The spectrum management tool 100 may display different types of information for different divisions of the allocation chart. For example, if a division of the allocation chart corresponds to a frequency band that includes further time divisions and/or frequency divisions, the spectrum management tool 100 may display such sub-divisions as part of the allocation and usage information for the division.

Figure 2:
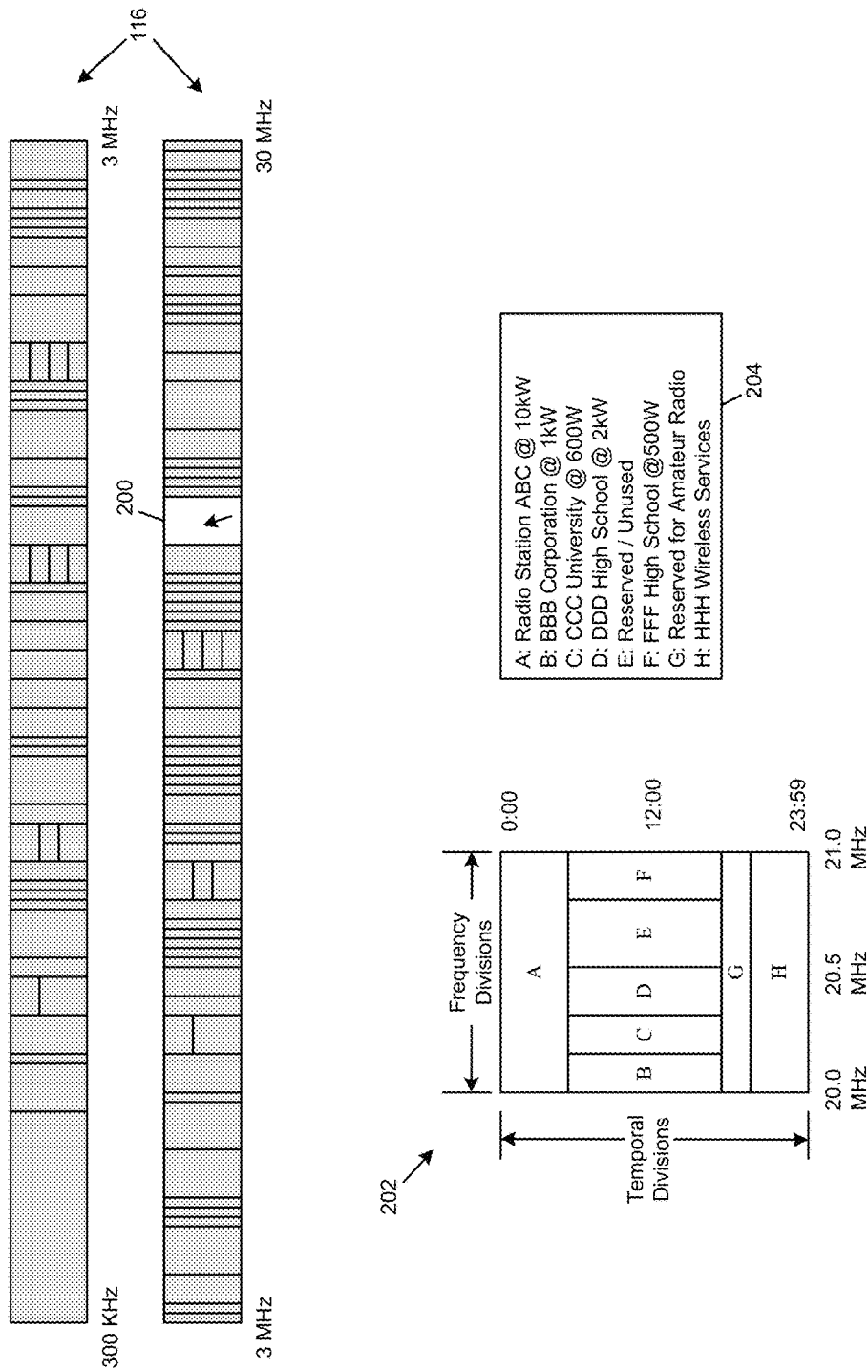
FIG. 2 illustrates the selection of a division in the allocation chart having frequency or time sub-divisions, consistent with an exemplary embodiment.

FIG. 2 illustrates the selection of a division in the allocation chart having frequency or time sub-divisions, consistent with an exemplary embodiment. As illustrated, the GUI of the spectrum management tool 100 is used to select a division of the allocation chart 116 that corresponds to the frequency band 200. The frequency band 200 occupies a range of 20 MHz~21 MHz in the radio spectrum. According to the retrieved usage and allocation data, the usage of the frequency band 200 is further divided into frequency divisions and temporal divisions, including divisions A, B, C, D, E, F, G, and H. These divisions share the use of the frequency band 200 by using the frequency band 200 at different time periods (time division) or at different portions of the frequency spectrum (frequency division). Some of the divisions have exclusive use of the frequency band 200 at different periods of time, such as the divisions A, G and H. Some of the divisions share the frequency band 200 at a same period of time at a different portion of the frequency spectrum, such as the divisions B, C, D, E, and F.

When the frequency band 200 is selected, the spectrum management tool 100 displays the sub-divisions of the frequency band 200. The spectrum management tool 100 also displays information of each sub-division. The displayed information for a sub-division includes information such as actual usage time, power level, and emission mask. In the example of FIG. 2, the spectrum management tool 100 lists the licensee and power level of each of the sub-divisions in an information window 204.

The spectrum management tool 100 also displays a sub-division chart 202 that shows the sub-divisions of the frequency band. In some embodiments, each sub-division in the sub-division chart 202 is a selectable GUI item. When a sub-division is selected, the spectrum management tool 100 may display further usage or allocation information regarding the selected sub-division.

National level databases (e.g., FCC) may not have information on how the frequency band 200 is divided and shared, especially for a specific geographical area. The spectrum management tool 100 therefore retrieves at least some of the information regarding the sub-divisions from databases of local governments, private entities, wireless service providers, or technical consortiums. In some embodiments, the allocation and usage information of different time or frequency sub-divisions of the selected frequency band are obtained from different databases.

Displaying the sub-divisions of a frequency band and their associated information is one way the spectrum management tool 100 assists in identifying spectrum-sharing opportunities. In some embodiments, the spectrum management tool 100 facilitates spectrum sharing by performing spectrum analysis to determine in-band and out-of-band interference between neighboring bands or divisions of the spectrum. In some embodiments, the tool determines the in-band and out-of-band interference based on allocation and usage data of neighboring bands or sub-bands. For example, the spectrum management tool 100 may obtain FCC out-of-band emissions limits data from the FCC database and 3GPP emissions masks information from a 3GPP consortium database. The spectrum management tool 100 may also query the databases of wireless carriers to obtain the out-of-band emissions data.

Figure 3:
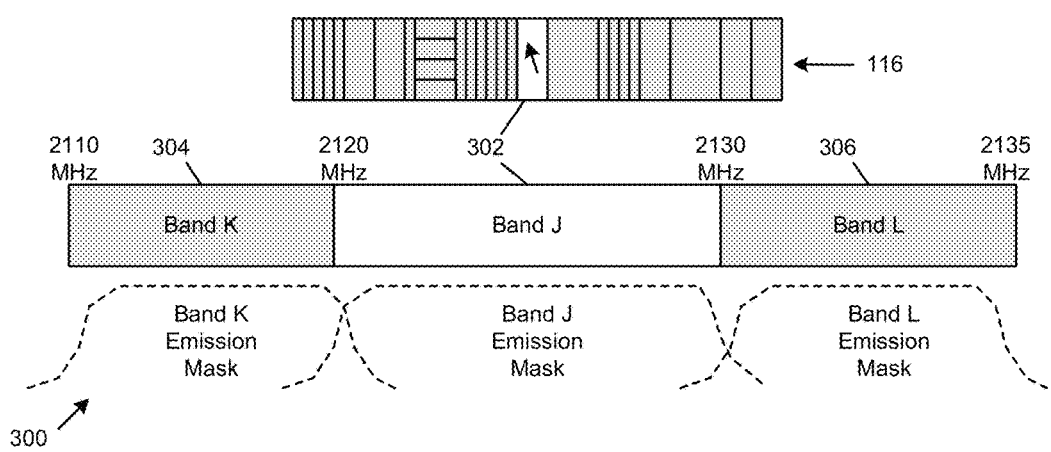
FIG. 3 illustrates the spectrum management tool displaying in-band and out-of-band interference of a selected frequency band, consistent with an exemplary embodiment.

FIG. 3 illustrates the spectrum management tool displaying in-band and out-of-band interference of a selected frequency band, consistent with an exemplary embodiment. The spectrum management tool provides an interference chart 300 for displaying the in-band and out-of-band interference of the selected frequency band.

As illustrated, the GUI of the spectrum management tool 100 is used to select a division 302 in the allocation chart 116. In this example, the division 302 corresponds to a frequency band that occupies a range of 2120 MHz~2130 MHz in the radio spectrum (labeled as Band J). Its adjacent divisions are division 304 (labeled as Band K) and division 306 (labeled as Band L).

The interference chart 300 correspondingly shows the in-band/out-of-band interference for the division 302. Specifically, the interference chart 300 is a GUI element that shows the emissions mask (or out-of-band emissions) for the divisions 302, 304, and 306. The user of the spectrum management tool 100 can use the GUI element 300 to determine the in-band interference of division 302 from out-of-band emissions of divisions 304 and 306.

In some embodiments, the spectrum management tool 100 also identifies the scope of applicability of the displayed usage information by e.g., displaying the license boundary or geographic scope of the selected band frequency.

Figure 4:
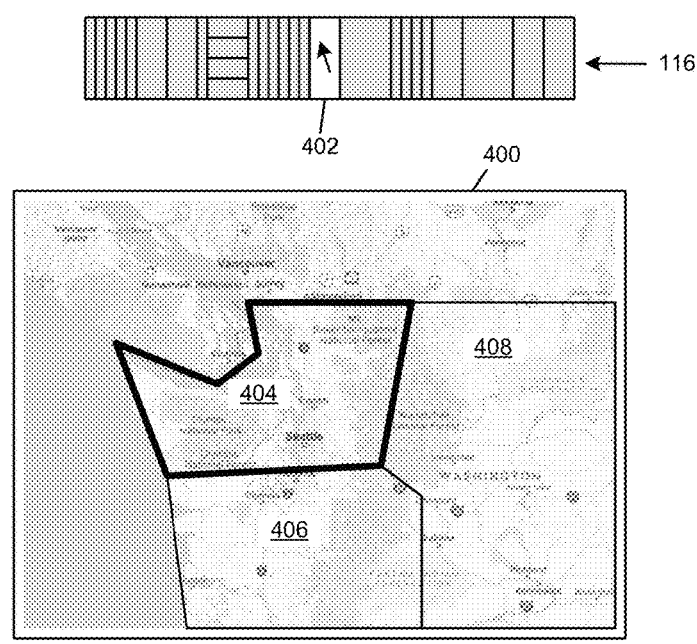
FIG. 4 illustrates the spectrum management tool displaying the license boundary of a selected frequency band, consistent with an exemplary embodiment.

FIG. 4 illustrates the spectrum management tool displaying the license boundary of a selected frequency band, consistent with an exemplary embodiment. The license boundary of the selected frequency band is displayed in a license boundary map 400.

As illustrated, the user uses the allocation chart 116 to select a spectrum division 402 in order to view information regarding the frequency band represented by the division 402. The spectrum management tool 100 in turn displays the license boundary map 400 as a GUI item. The map 400 shows a region 404 that corresponds to the license boundary or geographic scope for the spectrum division 402 at the selected location (Seattle, Wash.). To assist the user in identifying possible interference from other users of the same frequency band in nearby geographical areas, the spectrum management tool 100 may show license boundary or geographic scope of nearby licensees of the same frequency band. These neighboring license boundaries are illustrated as regions 406 and 408 over the map 400.

FIG. 1-4 illustrates the various GUI components of the spectrum management tool 100 that can be presented to the user. In some embodiments, the GUI of the tool 100 can be configured to present different combinations of usage and allocation information. For example, the spectrum management tool 100 may be configured to display the allocation chart 116, the allocation and usage information 114, the interference chart 300, and the license boundary map 400. For a spectrum division that is shared by temporal or frequency divisions, the spectrum management tool 100 may be configured to display the subdivision chart 202 and the subdivision information 204. In some embodiments, the GUI of the spectrum management tool provides a pull-down menu that includes multiple preset options, each preset option corresponding to a presentation based on a different combination of usage and allocation information.

As mentioned, the spectrum management tool 100 receives different parts of the allocation and usage information from different databases. More generally, different components of the information presented by the spectrum management tool 100 in response to a query about a frequency band may come from different databases.

Figure 5:
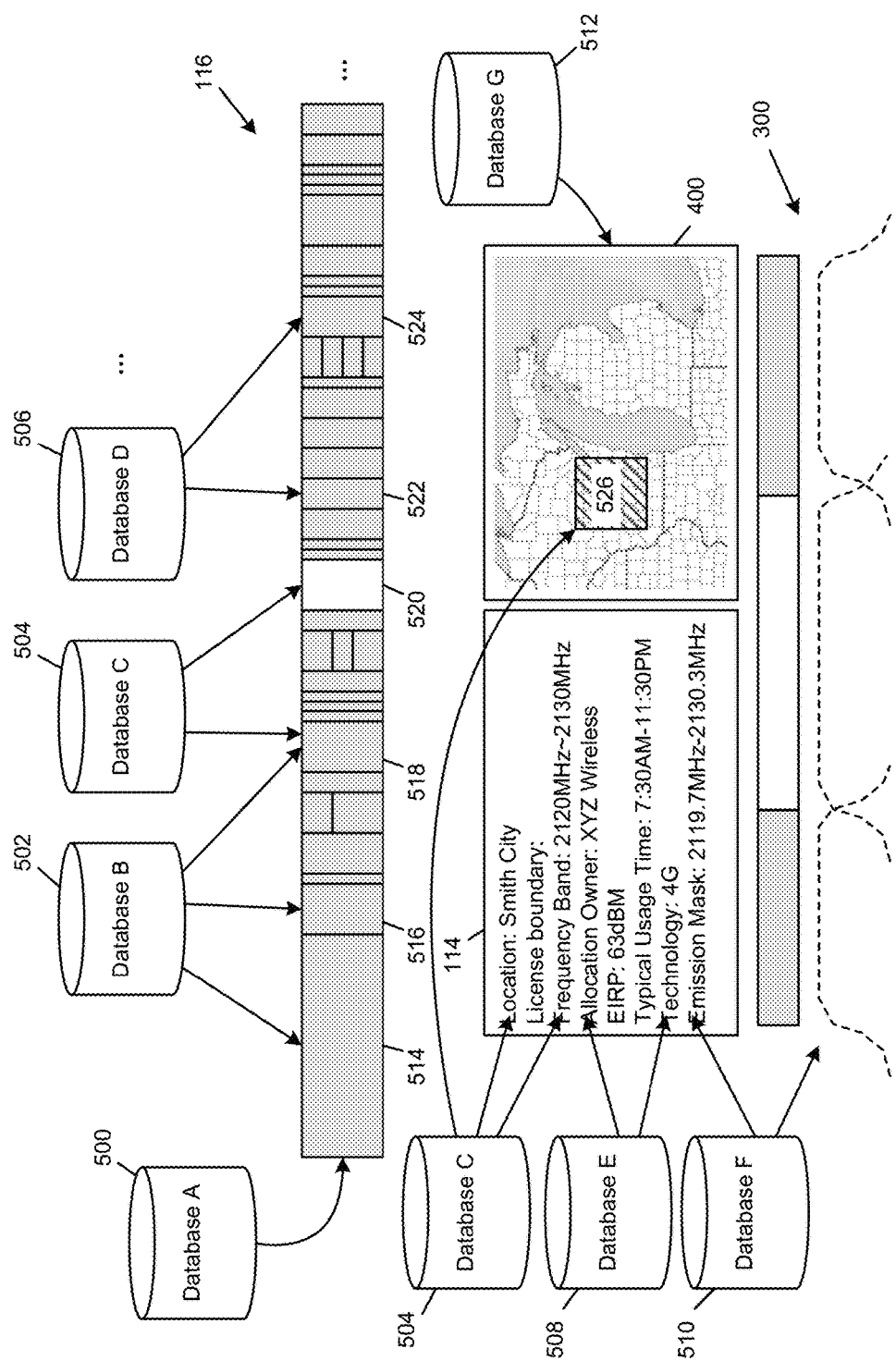
FIG. 5 conceptually illustrates the spectrum management tool using data from different databases to present information regarding a frequency band, consistent with an exemplary embodiment.

FIG. 5 conceptually illustrates the spectrum management tool 100 using data from different databases 500-512 to present information regarding a frequency band. To present the allocation chart 116, the tool obtains data from the database 500 regarding how the radio spectrum is divided or allocated nationally. Based on the data from the database 500, the allocation chart 116 is divided into spectrum divisions, including divisions 514-522. Each of the divisions represents to a frequency band.

In some embodiments, the spectrum management tool 100 receives a first set of usage data for a first set of frequency bands from a first database and receives a second set of usage data for a second, different set of frequency bands from a second database. When the selected frequency band is within the first set of frequency bands, the tool displays the received first set of usage data. When the selected frequency band is within the second set of frequency bands, the tool displays the received second set of usage data. In the example, the spectrum management tool 100 obtains data for different spectrum divisions from different databases. Specifically, the data obtained from the database 502 is applicable to frequency bands of spectrum divisions 514, 516, and 518; the data obtained from the database 504 is applicable to spectrum divisions 518 and 520; and the data obtained from the database 506 is applicable to spectrum divisions 522 and 524.

In some embodiments, the spectrum management tool 100 receives a first set of usage data for the selected frequency band from a first database and a second set of usage data for the selected frequency band from a second, different database. The received first and second usage data are then presented in one presentation for the selected frequency band. The first usage data includes a first property of the selected frequency band and the second usage data includes a second, different property of the selected frequency band.

In the example of FIG. 5, the data obtained from the database 502 and the data obtained from the database 504 are both applicable to the frequency band that corresponds to the spectrum division 518. The data obtained from the database 502 may provide a first set of usage data for the frequency band and the data obtained from the database 504 may provide a second set of usage data for the frequency band.

Also, in the example, the spectrum division 520 is selected, and the tool 100 shows the information window 114 which includes various usage and allocation data of the frequency band that correspond to the spectrum division 520. The tool obtains different subsets of the information shown in the window 114 from different databases. In the illustrated example, allocation data such as the frequency range and license boundary come from the database 504. Usage data such as power level, typical usage time, and wireless technology type comes from a database 508. Emissions mask data comes from a database 510.

The Emission mask data from the database 510 is also used to generate the in-band/out-of-band interference chart 300 for the selected frequency band. Geographic mapping data from a database 512 is used to generate the map 400, while license boundary data from the database 504 is used to highlight a region 526 that corresponds to the license boundary of the selected frequency band 520.

In some embodiments, the spectrum management tool 100 obtains usage data from different databases for different geographic locations. Specifically, the spectrum management tool presents a first set of usage data from a first database when the selected geographical location is a first location and presents a second set of usage data from a second database when the selected geographical location is a second location.

Figure 6:
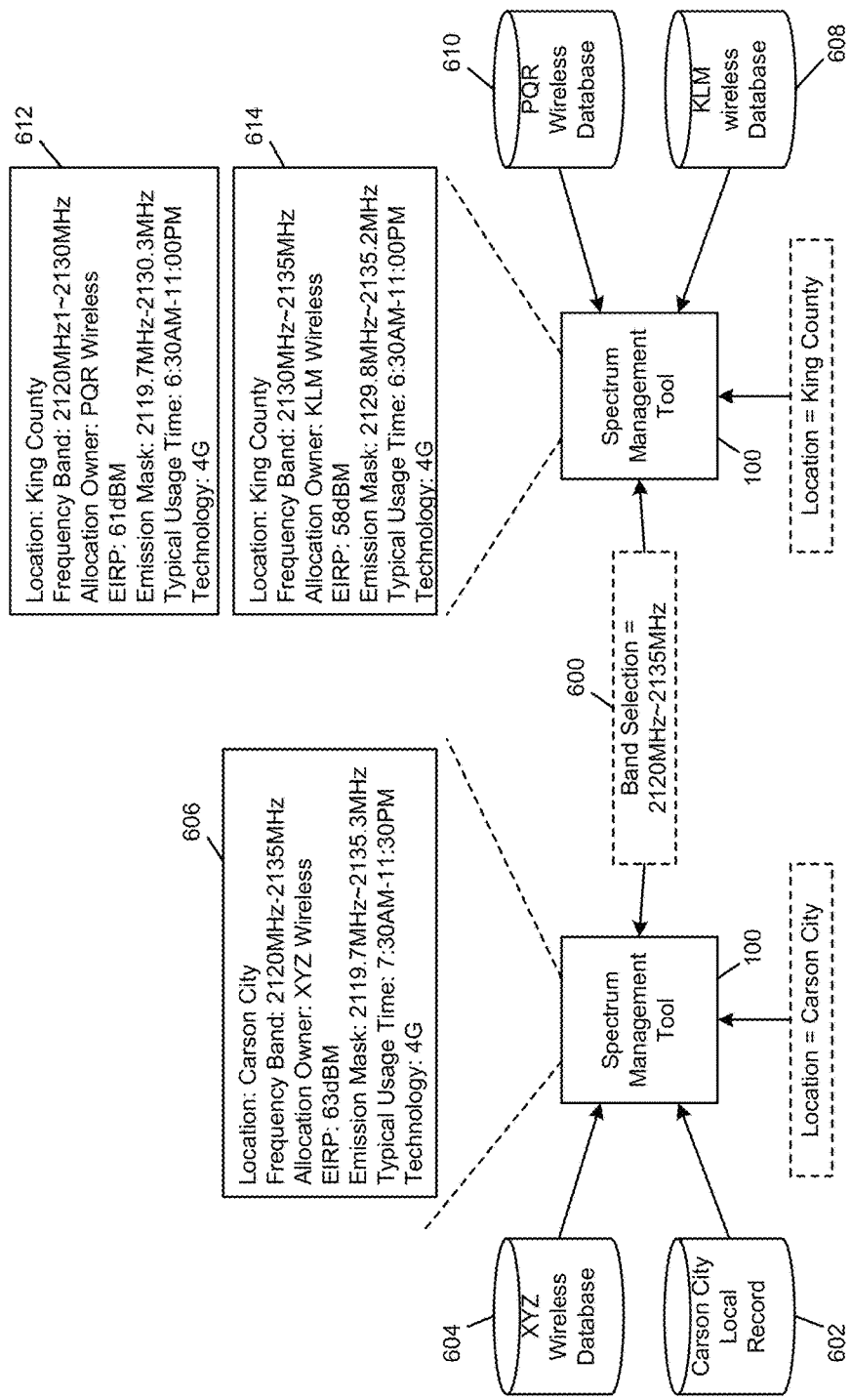
FIG. 6 illustrates the spectrum management tool obtaining usage data from different databases for different geographic locations, consistent with an exemplary embodiment.

FIG. 6 illustrates the spectrum management tool 100 obtaining usage data from different databases for different geographic locations. As illustrated, the spectrum management tool 100 receives the selection of a frequency band 600 (occupying a range of 2120 MHz~2135 MHz in the radio spectrum) for different geographical locations.

When the spectrum management tool 100 is queried for the frequency band 600 for a first geographical location ("Carson City"), the tool uses data from a database 602 related to the first geographical location ("Carson City local record") and a database 604 related to the wireless carrier that uses the frequency band 600 at the first geographical location ("XYZ wireless database"). The spectrum management tool 100 in turn presents a set of usage and allocation information 606 for the frequency band 600 at the first geographical location.

When the spectrum management tool 100 is queried for the same frequency band 600 for a second geographical location ("King County"), databases 608 and 610 related to the wireless carriers that uses the frequency band 600 at the second geographical location ("KLM wireless database" and "PQR wireless database"). The spectrum management tool 100 in turn presents usage and allocation information 612 and 614 for the frequency band 600 at the second geographical location. The two sets of usage and allocation information 612 and 614 are for two different entities ("PQR Wireless" and "KLM Wireless") that share the frequency band 600 at the second geographical location.

Example Computing Device

Figure 7:
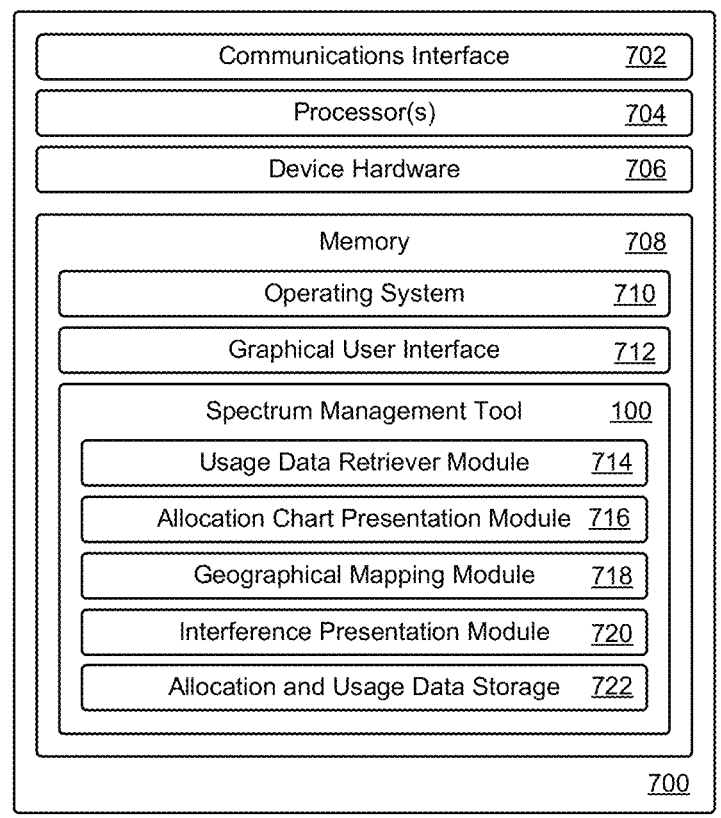
FIG. 7 illustrates a block diagram showing various components of the computing device implementing the spectrum management tool, consistent with an exemplary embodiment of the disclosure.
Figure 7:
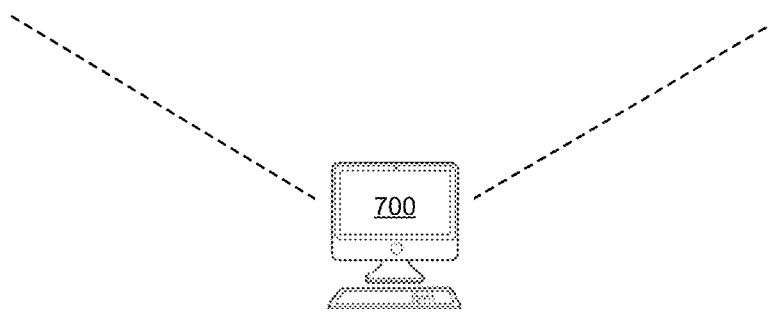

FIG. 7 is a block diagram showing various components of the spectrum management tool 100, consistent with an embodiment of the disclosure. As illustrated, a computing device 700 implements the spectrum management tool 100. The computing device 700 may be a general purpose computer, such as a desktop computer, tablet computer, laptop computer, server, or other electronic devices that are capable of receiving inputs, processing the inputs, and generating output data. In some embodiments, the computing devices 700 may be virtual computing devices in the form of virtual machines or software containers that are hosted in a cloud.

The computing device 700 may be equipped with a communications interface 702, one or more processors 704, device hardware 706, and memory 708. The communications interface 702 may include wireless and/or wired communication components that enable the computing devices to transmit data to and receive data from other devices, whether through a dedicated wired connection or via a communications network. The device hardware 706 may include additional hardware that performs user interface, data display, data communication, data storage, and/or other server functions.

The memory 708 may be implemented using computer-readable medium, such as computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 704 and the memory 708 of the computing devices 700 may implement an operating system 710, a graphical user interface (GUI) 712, and the spectrum management tool 100. The operating system 710 may include components that enable the computing devices 700 to receive and transmit data via various interfaces (e.g., user controls, communications interface, and/or memory input/output devices), as well as process data using the processors 704 to generate output. The operating system 710 may include a presentation component that presents the output (e.g., display the data on an electronic display, store the data in memory, transmit the data to another electronic device, etc.). Additionally, the operating system 710 may include other components that perform various additional functions generally associated with an operating system.

The graphical user interface (GUI) module 712 is a program that allows the computing device 700 to receiving inputs graphically and to present outputs graphically. The GUI module causes the computing device to display GUI for presenting outputs of various programs running on the computing device. The GUI module 712 also causes the computing device to display graphical items that can be used to receive inputs by selection (via cursor, touch screen, user gesture, etc.) or by textual input. In some embodiments, the GUI module 712 is part of the operating system 710.

The spectrum management tool 100 is a program running on the computing device 700. It uses the GUI module 712 to display allocation charts, maps, interference data, usage and allocation data, etc. It also uses the GUI module 712 to receive the selection of a frequency band, of a division of the spectrum, or of a geographic location. The spectrum management tool 100 includes a usage data retriever module 714, an allocation chart presentation module 716, a geographical mapping module 718, an interference presentation module 720, and an allocation and usage data storage 722.

The usage data retriever module 714 is a component of the spectrum management tool 100 that retrieves and receives allocation and usage data from different databases maintained at various international, national, and local entities that operate and use the radio spectrum. Other components of the spectrum management tool 100 use the retrieved usage data to generate presentations at the GUI. The retrieved data is stored in the allocation and usage data storage 722.

The allocation chart presentation module 716 is a component of the spectrum management tool 100 that manages the display of allocation charts such as the allocation chart 116 and the sub-division chart 202. These allocation charts are displayed as selectable GUI items through the GUI module 712 to receive selections of frequency bands or divisions of the spectrum.

The geographic mapping module 718 is a component of the spectrum management tool 100 that manages the display of geographical maps as well as any license boundary in the retrieved allocation and usage data (such as the license boundary map 400 and the license boundaries 404-408). The interference presentation module 720 is a component of the spectrum management tool 100 that manages the display of interference charts (such as the interference chart 300) based on in-band or out-of-band emissions data of the neighboring bands.

Figure 8:
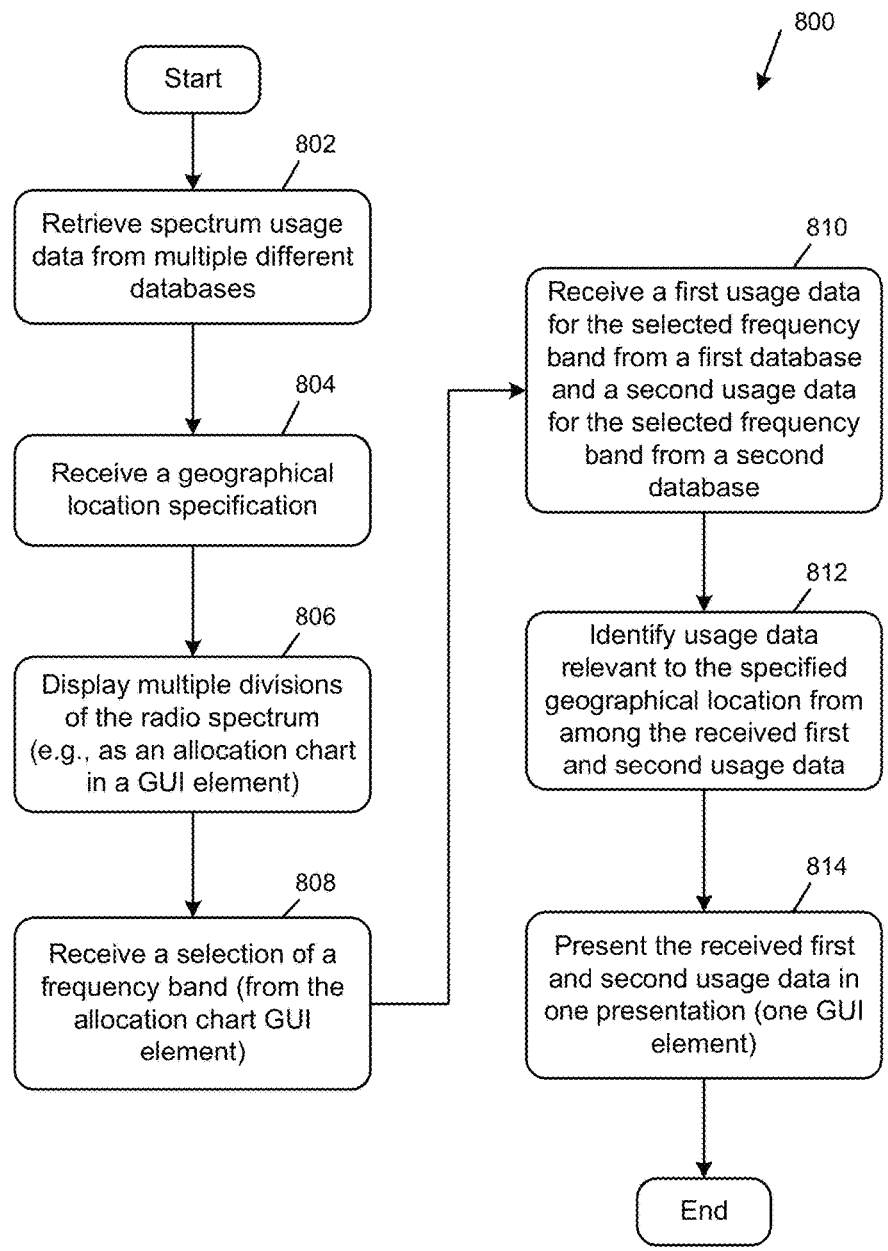
FIG. 8 conceptually illustrates a process for operating an interactive spectrum management tool at the computing device.

FIG. 8 conceptually illustrates a process 800 for operating an interactive spectrum management tool at the computing device 700. The process 800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

At block 802, the spectrum management tool retrieves or receives spectrum usage data from multiple different databases (e.g., national level databases, local level databases, databases of private and public institutions, databases of technical consortiums, database of wireless carriers, etc.)

At block 804, the spectrum management tool receives a geographical location. The user of the tool may specify the location through the user interface of the tool. The tool may also receive the geographical location from a location sensor of the computing device (e.g., global positioning system data).

At block 806, the spectrum management tool displays multiple divisions of the frequency spectrum (e.g., as an allocation chart in a GUI element such as 116).

At block 808, the spectrum management tool receives a selection of a frequency band. (This selection may come from the selection of a division in an allocation chart GUI element.)

At block 810, the spectrum management tool receives a first usage data for the selected frequency band from a first database and a second usage data for the selected frequency band from a second, different database. Generally, the spectrum management tool receives multiple types of usage data for the selected frequency band from multiple different databases.

At block 812, the spectrum management tool identifies usage data relevant to the specified geographical location from among the received first and second usage data.

At the block 814, the spectrum management tool presents the identified relevant usage data (from different databases) in one presentation such as one GUI element or multiple GUI elements that are displayed simultaneously by the GUI. The process 800 then ends.

The spectrum management tool as described is useful for discovering new spectrum opportunities, understanding radio characteristics of available frequency band, supporting bidding decisions in spectrum auctions, as well as determining the value of a candidate frequency band. For example, the spectrum management tool may use a first set of usage data from a first database and a second set of usage data from a second, different database to determine whether to transmit signals in a particular frequency band at a particular time interval. More generally, the spectrum management tool may use usage data from multiple different databases to identify and select spectrum opportunities (e.g., suitable time division and frequency divisions of the radio spectrum) for transmission for the current time and location.

In some embodiments, the spectrum management tool may be installed on a radio signal transmission device (e.g., a base station of a cellular network) to automatically identify spectrum opportunities for transmission. The radio signal transmission device in turn uses the identified spectrum opportunities to transmit signals. In some embodiments, the spectrum management tool identifies spectrum opportunities by identifying or determining (i) one or more suitable frequency bands for a particular geographical location, (ii) one or more suitable time divisions to use the identified frequency bands, and (iii) appropriate transmissions power levels when using the identified one or more frequency bands. The spectrum management tool in turn configures the radio transmission device to transmit signals at an identified spectrum opportunity at a corresponding appropriate power level.

Figure 9:
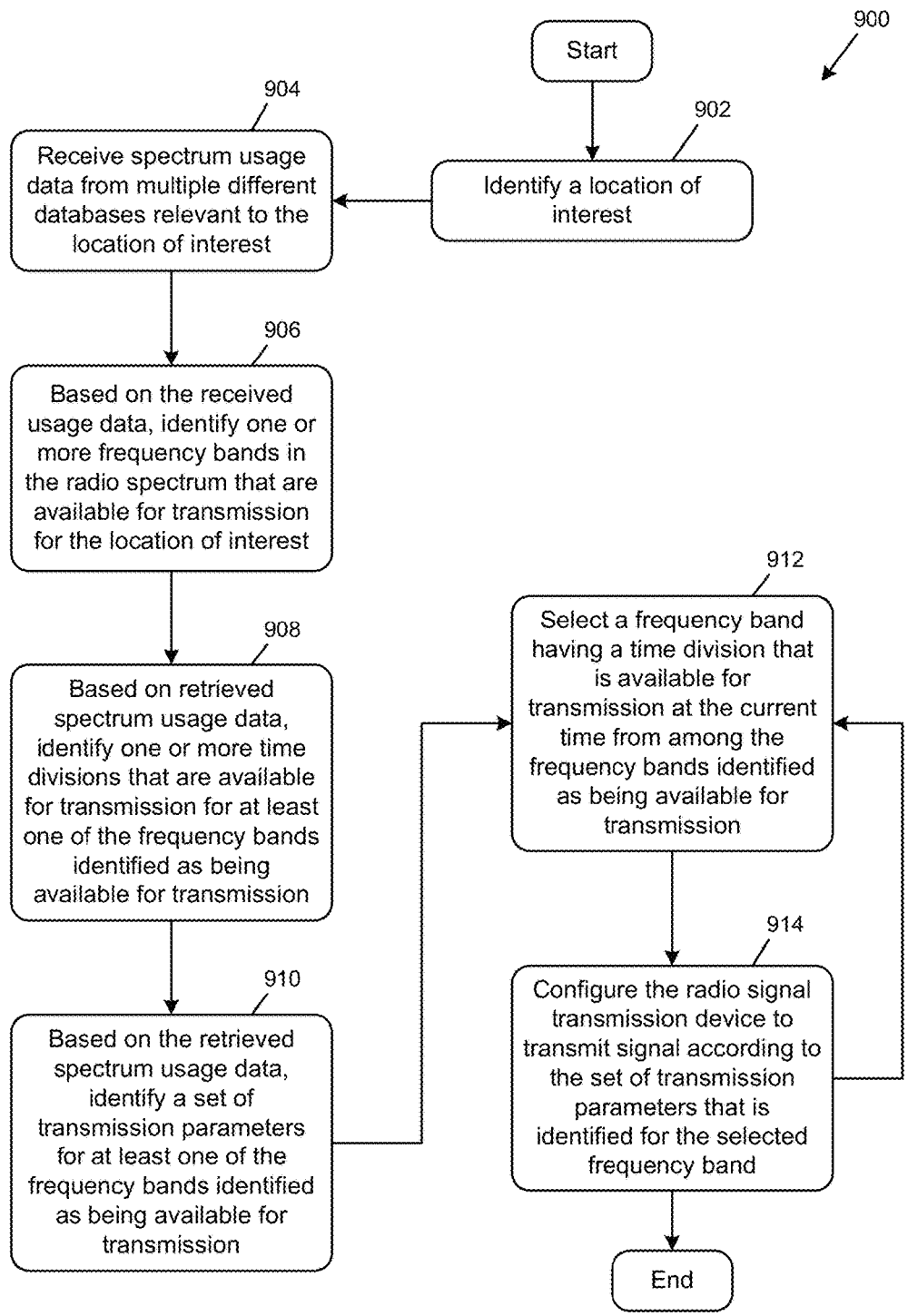
FIG. 9 conceptually illustrates a process for identifying spectrum opportunities and for directing a radio signal transmission device to use the identified spectrum opportunities.

FIG. 9 conceptually illustrates a process 900 for identifying spectrum opportunities and for directing a radio signal transmission device to use the identified spectrum opportunities. A computing device controlling a base station of a cellular network may perform the process 900 when using the spectrum management tool to search for an available frequency band for transmission. In some embodiments, a spectrum management tool that is used to automatically identify spectrum opportunities may not be configured to present a GUI.

The process 900 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

At block 902, the computing device identifies a location of interest. The user of the computing device may specify the location of interest through a user interface (e.g., input 120 to the GUI). The computing device may also identify the location of interest by receiving a coordinate from a global positioning system (GPS). A base station implementing the spectrum management tool may use its own position as the location of interest.

At block 904, the computing device receives spectrum usage data from multiple different databases (e.g., national level databases, local level databases, databases of private and public institutions, databases of technical consortiums, etc.) The received usage data includes data relevant to the identified location of interest.

At block 906, the computing device identifies, based on the received usage data, one or more frequency bands in the radio spectrum that are available for transmission for the location of interest. For example, the computing device may determine that, based on federal allocation database (e.g., FCC database), a first frequency band is unavailable for civilian use. Based on various local databases, wireless carrier databases, and/or other carrier databases, the computing device may also determine that a second frequency band is unused and therefore available for transmission. The computing device may also determine that, a third frequency band is not always being used, and therefore available for transmission at certain time divisions.

At block 908, based on the retrieved spectrum usage data, the computing device identifies one or more time divisions that are available for transmission for at least one of the frequency bands identified as being available for transmission. As described by reference to FIG. 2 above, the spectrum management tool may identify temporal divisions of a given frequency band and determine the usage data for each identified temporal division.

At block 910, based on the retrieved spectrum usage data, the computing device optionally identifies a set of transmission parameters for at least one of the frequency bands identified as being available for transmission. For example, the spectrum management tool may determine how much out-band emission is allowed when transmitting in a particular frequency band based on government regulations included in the retrieved usage data. The spectrum management tool may also determine how much in-band interference is expected from neighboring frequency bands based on the usage data of the bands neighboring the particular frequency band. The spectrum management tool may also determine how much power can be used for transmission based on the license boundary assigned to the particular frequency band.

At block 912, the computing device selects a frequency band having an available time division that is available for transmission at the current time from the frequency bands identified as being available for transmission. As time advances, the spectrum management tool may switch from one frequency band to another frequency band for transmission based on which frequency band has an available time division for transmission. The spectrum management tool may also temporarily shut down transmission if no frequency bands are available for transmission at the current time.

At block 914, the computing device configures the radio signal transmission device to transmit signals on the selected frequency band. The signals may be transmitted according to (or in compliance with) the set of transmission parameters identified for the selected frequency band (e.g., the transmission parameters identified at block 910). For example, the computing device may configure the radio signal transmission device to output at a specified power level in order to stay within the license boundary of the frequency band and/or to avoid impermissible out-of-band emissions. The process 900 then ends or returns to 912 to continuously identify new spectrum opportunities as time advances.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing device comprising:
one or more processors; and
a computer-readable medium storing a plurality of computer-executable components that are executable by the one or more processors to perform a plurality of actions, the plurality of actions comprising:
receiving usage data from a plurality of different databases regarding usage of radio spectrum;
identifying one or more frequency bands of the radio spectrum that are available for transmission for a location of interest based on the received usage data;
identifying one or more time divisions that are available for transmission for the one or more frequency bands identified as being available for transmission based on the received usage data;
selecting a frequency band having a time division that is available for transmission at a current time from among the one or more frequency bands identified as being available for transmission;
presenting a first set of usage data for the selected frequency band from a first database and a second set of usage data for the selected frequency band from a second, different database in one presentation for the selected frequency band; and
configuring a radio signal transmission device to transmit a signal on the selected frequency band.

2. The computing device of claim 1, wherein the plurality of actions further comprises:
identifying a set of one or more transmission parameters for at least one frequency band identified as being available for transmission based on the received usage data,
wherein configuring the radio signal transmission device includes configuring the radio signal transmission device to transmit the signal on the selected frequency band according to the set of one or more transmission parameters that is identified for the selected frequency band.

3. The computing device of claim 2, wherein the one or more transmission parameters include an amount of out-band emission that is allowed when transmitting on the selected frequency band, an amount of inter in-band interference expected from neighboring frequency bands of the selected frequency band based on usage data for the neighboring frequency bands, or an amount of transmission power used for transmitting the signal based on a license boundary assigned to the selected frequency band.

4. The computing device of claim 2, wherein configuring the radio signal transmission device to transmit the signal on the selected frequency band according to the set of one or more transmission parameters comprises configuring the radio signal transmission device to output at a particular power level in order to stay within a license boundary of the frequency band and to avoid impermissible out-of-band emissions.

5. The computing device of claim 1, wherein the received usage data comprises a set of a license boundary information for the selected frequency band, a set of actual of usage time for the selected frequency band, or a power level specification for the selected frequency band.

6. The computing device of claim 5, wherein the received usage data further identifies at least one of actual usage time, power level, and emission mask for the time or frequency divisions.

7. The computing device of claim 1, wherein the received usage data identifies one or more time divisions or one or more frequency divisions for the selected frequency band.

8. The computing device of claim 1, wherein the received usage data comprises a first set of usage data for a first set of frequency bands from a first database and a second set of usage data for a second, different set of frequency bands from a second database.

9. The computing device of claim 1, wherein the received usage data comprises static information for the selected frequency band and dynamic real-time information for the selected frequency band.

10. The computing device of claim 1, wherein the plurality of actions further comprises:
presenting a third usage data from a third database when the location of interest is a first location;
presenting a fourth usage data from a fourth database when the location of interest is a second location.

11. The computing device of claim 1, wherein the one presentation comprises an interference chart based on an emissions mask of the selected frequency band.

12. A computer-implemented method, comprising:
receiving usage data from a plurality of different databases regarding usage of radio spectrum;
identifying one or more frequency bands of the radio spectrum that are available for transmission for a location of interest based on the received usage data, wherein the received usage data comprises a first set of usage data from a first database for a first location and a second set of usage data from a second database for a second location;

identifying one or more time divisions that are available for transmission for the one or more frequency bands identified as being available for transmission based on the received usage data;

selecting a frequency band having a time division that is available for transmission at a current time from among the one or more frequency bands identified as being available for transmission; and configuring a radio signal transmission device to transmit a signal on the selected frequency band.

13. The computer-implemented method of claim 12, further comprises:

identifying a set of one or more transmission parameters for at least one frequency band identified as being available for transmission based on the received usage data, wherein configuring the radio signal transmission device includes configuring the radio signal transmission device to transmit the signal on the selected frequency band according to the set of one or more transmission parameters that is identified for the selected frequency band.

14. The computer-implemented method of claim 13, wherein configuring the radio signal transmission device to transmit the signal on the selected frequency band according to the set of one or more transmission parameters comprises configuring the radio signal transmission device to output at a particular power level in order to stay within a license boundary of the frequency band and to avoid impermissible out-of-band emissions.

15. The computer-implemented method of claim 12, wherein the received usage data comprises a set of a license boundary information for the selected frequency band, a set of actual of usage time for the selected frequency band, or a power level specification for the selected frequency band.

16. The computer-implemented method of claim 12, wherein the received usage data identifies one or more time divisions or one or more frequency divisions for the selected frequency band, wherein the received usage data further identifies at least one of actual usage time, power level, and emission mask for the time or frequency divisions.

17. The computer-implemented method of claim 12, wherein the received usage data comprises a first set of usage data for a first set of frequency bands from a first database and a second set of usage data for a second, different set of frequency bands from a second database.

18. One or more non-transitory computer-readable media of a mobile device storing computer-executable instructions that upon execution cause one or more processors to perform acts comprising:

receiving usage data from a plurality of different databases regarding usage of radio spectrum;

identifying one or more frequency bands of the radio spectrum that are available for transmission for a location of interest based on the received usage data, wherein the received usage data comprises a first set of usage data from a first database for a first location and a second set of usage data from a second database for a second location;

identifying one or more time divisions that are available for transmission for the one or more frequency bands identified as being available for transmission based on the received usage data;

selecting a frequency band having a time division that is available for transmission at a current time from among the one or more frequency bands identified as being available for transmission; and configuring a radio signal transmission device to transmit a signal on the selected frequency band.

* * * * *